3,342,615
MANUFACTURE OF KILN FURNITURE
Eldon D. Miller, Jr., Bridgeville, Pa., assignor to Harbison-Walker Refractories Company, Pittsburgh, Pa., a corporation of Pennsylvania
No Drawing. Filed Aug. 7, 1964, Ser. No. 388,283
12 Claims. (Cl. 106—44)

ABSTRACT OF THE DISCLOSURE

In alumina-mullite-bonded, coarsely graded, silicon carbide-containing refractory of the type found in United States Patent No. 3,230,100, the improvement comprising eliminating coring by the addition of 0.2 to 10% of hydrated alumina.

---

This invention relates to the manufacture of kiln furniture. In particular, it relates to the manufacture of kiln furniture from high alumina material and coarsely graded silicon carbide. The composition further includes a unique combination of matrix-forming ingredients.

This invention is an improvement in the invention of copending application Ser. No. 280,387, filed May 14, 1963, entitled, "Refractory," and owned by the same assignee as the present invention. Application Ser. No. 280,-387 is, in turn, a continuation-in-part of application Ser. No. 212,063, filed July 24, 1962, of the same title and assignee. Application Ser. No. 212,063 has been abandoned in favor of the continuation-in-part application Ser. No. 280,387.

That application was combined with the substance of application Ser. No. 205,535, of June 27, 1962, as new application Ser. No. 436,412. Application Ser. No. 436,-412 is now United States Patent No. 3,230,100. Applications 205,535, 212,063, and 280,387 have been abandoned.

In one aspect, the invention relates to kiln furniture containing high alumina materials. By high alumina, for the purposes of this invention, and pursuant to the practice and understanding in the art, we refer to alumina materials which contain at least 50%, by weight, of $Al_2O_3$, on an oxide basis. In one aspect, the present invention and the invention of the copending application, just noted, are improvements in my United States application entitled, "Alumina Refractories," United States Patent No. 3,067,-050.

In both the copending application and the patent, above identified, it is explained that high alumina refractories are generally classified by their $Al_2O_3$ content into groups having approximately 50, 60, 70, 80, 90, or 99% $Al_2O_3$, on an oxide analysis. Those containing 50 to 90% of $Al_2O_3$ are made by blending various high alumina refractory materials with those of the higher up to about 99% content. These practices are well described in my patent, above identified, and that discussion is incorpoarted herein by reference. One prior art practice is to add minor amounts of clay or silica to adjust the alumina content. Calcined flint clay is one such clay.

Refractory brick in simple shapes of high alumina content and of the high alumina-containing shapes of the type disclosed in the copending application Ser. No. 280,387, are usually made by the power press, impact press, extrusion press and, for some complex shapes, by various methods of casting. When the shapes are made on a press, the raw materials are ground, screened to desired sizes, blended, and mixed with small and controlled amounts of various tempering agents or fluids well known to those in the art. Exemplary tempering agents are water, lignin, various inorganic water-soluble salts in aqueous solution, such as sulfate, chromates, and the like. Some organic materials, such as dextrine, are also used.

The high silicon carbide content refractory of application Ser. No. 280,387 has proved very satisfactory in service. However, in commercial production, some difficulties have been encountered in manufacture. If firing temperatures are not carefully controlled, a condition I term "coring" sometimes occurs. By coring, I mean that there is a central area in the brick which is not uniformly oxidized by heat treatment to the desired extent. When the desired oxidation and bond formation is not obtained throughout the brick, when subjected to temperatures high enough to mature the ceramic bond, and subsequent high temperatures such as are frequently encountered by kiln furniture in service, blebs or droplets of glassy material may appear over exposed surfaces. It has been theorized that this material, which is an amorphous glassy material, evolves by service reduction of silicon carbide into free silica, which material migrates through the body of the shape to be deposited eventually over exterior surfaces. Too much of this material, of course, leads to sticking of ware to the kiln furniture after extended service. Accordingly, it is an object of this invention to provide means to substantially eliminate coring and its related difficulties in silicon carbide-containing tile of the type disclosed and claimed in application Ser. No. 280,387.

It is a further object of this invention to provide a more commercially-acceptable method of making the silicon carbide-containing kiln furniture of the type disclosed in application Ser. No. 280,387.

Briefly, this invention is, in large part, predicated upon the discovery that coring can be eliminated by the addition of from about 0.2 to about 10%, by weight, of a particular hydrated alumina. This hydrated alumina is characterized by substantial freedom of iron oxide and titanium oxide impurities, the pair not exceeding about 1%, by weight, of the total weight of the hydrated alumina. In part, due to its purity, the selected hydrated alumina is white in color. The average particle size thereof is less than one micron. At least about 99% of the particles passes a 325 mesh screen. The following table sets forth typical analyses, on an oxide basis, of the preferred hydrated alumina:

TABLE I

| | Percent |
|---|---|
| Silica ($SiO_2$) | 0.10 |
| Iron oxide ($Fe_2O_3$) | 0.04 |
| Soda ($Na_2O$) | 0.50 |
| Titania ($TiO_2$) | 0.002 |
| Combined water (dry basis) | 34.70 |
| Alumina ($Al_2O_3$) | 64.4 |

This hydrated alumina is substantially free of free water, the maximum being on the order of about 1%. It should be noted from the Table I analyses, that the preferred hydrated alumina contains a substantial amount of combined water, i.e. water of crystallization. In fact, it amounts to about ⅓ the total weight of the material.

The use of this hydrated alumina appears to modify the character of the matrix one obtains in a fired shape, as compared to that obtained according to the teachings of application Ser. No. 280,387. The modification or change is minor but it appears to open up the structure of the matrix somewhat in that, while total volume of voids is small, one finds more interconnected pores. These additional pores are believed, in large part, to allow for more uniform oxidation during firing of shapes, assuring the formation of the desired mullite matrix and eliminating coring. As noted above, by eliminating this coring, I have also substantially eliminated glazing in service.

In typical practice of this invention, batches are prepared in the following manner: A high alumina refractory mixture of desired $Al_2O_3$ content and having the desired coarse silicon carbide content is prepared according to the teachings of the application Ser. No. 280,387. This batch includes from 1 to not over 10%, by weight, based on the total weight of the dry batch, of volatilized silica. Crystalline silica, such as potters flint, can be substituted for from 0 to 9% of the volatilized silica, but it is essential that at least 1% of the total silica addition be volatilized silica. From 0.2 to not over 10%, by weight, of the selected aluminum hydrate, as above identified, is also included in the batch. Typical overall sizing for a batch is about as follows:

TABLE II

| | Percent |
|---|---|
| Alumina (−28+325 mesh) | 10 |
| Silicon carbide (−6+30 mesh) | 50 |
| Hydrated alumina (1 micron) | 5 |
| Alumina (−325 mesh) | 25 |
| Crystalline silica (−200 mesh) | 5 |
| Volatilized silica | 5 |

With regard to the foregoing sizing, it is essential that the major portion of the silicon carbide be coarser than 30 mesh U.S. Series screen. The top size is subject to more elastic control. A small proportion (perhaps 5%) of the silicon carbide particles can be as coarse as 4 mesh U.S. Series screen. Thus, I would hold that optimum conditions would have substantially all the silicon carbide −6+30 mesh. Regarding the variation in sizing towards the fine side, I know that substitution of a 35 U.S. mesh screen, or even a 48 mesh one, for the preferred 30 mesh screen would yield a departure only in degree from the preferred sizing, but in no case should any appreciable portion of the silicon carbide be finer than 70 mesh.

It is stated that some silicon carbide can pass a 70 mesh screen U.S. series. It should be understood that such a refractory would not be the best one for fabrication of shapes according to the invention, and resulting shapes could only be used in somewhat less critical areas. In general, I would state that 10 to 20% of the silicon carbide component could be −70 mesh.

As to the sizing of the silica, alumina, and aluminum hydrate, it is essential that at least a portion of the silica be volatilized silica, which is inherently −325 mesh and more accurately approaches submicron average particle diameter. I would prefer all of the silica be −325 mesh. The hydrated alumina, as noted above, is inherently about 1 micron. The alumina is size graded as required to make a workable refractory batch within my overall teachings of sizing, disclosed above. This, of course, indicates that the sizing of the alumina is more or less variable, in that the sizing of the silicon carbide and silica must be contained within critically controlled ranges.

If desired, some zircon can be substituted for the silicon carbide. However, it is critical that when a mixture of silicon carbide and zircon is used that the weight ratio not exceed 2 parts zircon to 1 part silicon carbide.

The preferred range of ingredients is as follows: The silicon carbide ranges between 50 and 70% of the total weight of the mix. The hydrated alumina ranges between 0.2 and 10% of the mix, and the alumina and silica vary between a 90/10 alumina-silica weight ratio to a 60/40 alumina-silica ratio. Additionally, in a further embodiment, the silicon carbide can vary between at least 25 to 50% of the total weight of the batch, the hydrated alumina between 0.2 and 10%, with the alumina and silica in a weight ratio of about 90/10, but in which the silica content can vary between 5 and 15%.

The chemical analyses of the various materials used in the practice of this invention are set out in detail in the copending application Ser. No. 280,387, which analyses is incorporated herein by reference.

The following is the preferred composition for the practice of this invention:

TABLE III

| | Percent |
|---|---|
| Alumina | 35 |
| Silicon carbide | 50 |
| Hydrated alumina | 5 |
| Crystalline silica | 5 |
| Volatilized silica | 5 |

The sizing of the batch would be as set forth in the table of preferred sizing, supra. The preferred method of manufacture includes tempering the batch with about 5%, by weight, of water, forming shapes from the tempered batch at a pressure of about 8000 p.s.i., and burning the shapes at about cone 18 (about 2700° F.).

Modulus of rupture at room temperature for shapes made according to these preferred teachings is about 2500 p.s.i. Cold crushing strength on flat is about 14,030 p.s.i. Porosity is about 15%. The shapes have no loss in an ASTM C-122 panel spalling test with a preheat of 3000° F. They have a permeability, "K," on the order of about 0.005. (K is air flow in in.³/sec./in.²/in. thickness/p.s.i. air pressure). There is no glazing or curing of the shapes.

In a sag test at 2500° F., in which 12 x 4 x ⅝″ straights were held for 24 hours at a temperature of 2500° F. and centrally loaded with approximately 22 lbs., there was 0.01 inch deflection. I was particularly surprised that the hydrate addition had little effect on the resistance of tile according to this invention to deflection in the sag test.

Having thus described the invention in detail and with sufficient particularity as to enable those skilled in the art to practice it, what is desired to have protected by Letters Patent is set forth in the following claims:

I claim:

1. A batch consisting essentially of finely divided silica, at least 1%, by weight, of the batch being volatilized silica, silicon carbide, and a high alumina refractory material selected from the group consisting of alumina, aluminum ores, and mixtures thereof containing at least about 50% $Al_2O_3$, by analysis; and hydrated alumina, the silicon carbide constituting from about 50 to 70%, by weight, of the refractory and the major portion thereof being about −4+48 U.S. standard mesh screen sizing with not more than about 20% of the silicon carbide passing a 70 U.S. standard mesh screen, from about 0.2 to 10% of the hydrated alumina, substantially all said hydrated alumina being −325 mesh, the high alumina material and silica constituting the remainder of the batch and being present in a weight ratio of alumina to silica between about 90/10 and 60/40, the silica substantially all being −200 mesh, total silica being between 1 and 10%, the alumina material being size graded to prepare a brickmaking batch.

2. A batch consisting essentially of silicon carbide, zircon, and alumina refractory material selected from the group consisting of alumina, aluminum ores, and mixtures thereof containing at least about 50% of $Al_2O_3$, by analysis; hydrated alumina, and silica, the silicon carbide and zircon constituting between about 50 and 70%, by weight, of the batch, the silicon carbide and zircon being present in a weight ratio not exceeding 2 parts zircon to 1 part silicon carbide, the silicon carbide being substantially −4+48 U.S. standard mesh with not more than about 2°% of the silicon carbide passing a 70 U.S. standard mesh screen, at least about 1% of the silica being volatilized silica, based on total batch weight, total silica being between 1 and 10% and substantially all of the silica passing a 200 mesh screen, from 0.2 to about 10% of the batch being hydrated alumina, the hydrated alumina being all −325 mesh, the alumina and silica being present in a weight ratio between about 90/10 and 60/40, the alumina material being sized graded to make a size graded brickmaking batch.

3. A batch consisting essentially of silicon carbide, alumina material selected from the group consisting of alumina, aluminum ores, and mixtures thereof containing at least about 50% of $Al_2O_3$, by analysis; finely divided silica, and hydrated alumina, the silicon carbide comprising from at least about 25% to not more than about 50%, by weight, of the body, the major portion of the silicon carbide being about −4+48 U.S. standard mesh with not more than about 20% of the silicon carbide passing a 70 U.S. standard mesh screen, from 0.2 to about 10%, by weight, of hydrated alumina, at least about 1% of the silica being volatilized silica, said 10% based on total batch weight, the alumina material and silica being present in a weight ratio of 90/10 but in which the silica ranges from about 5 to about 15%, by weight, of the total weight of the batch, said alumina being size graded to provide a brickmaking batch.

4. A batch consisting essentially of silicon carbide, zircon, alumina materials selected from the group consisting of alumina, aluminum ores, and mixtures thereof containing at least about 50% of $Al_2O_3$, by analysis; silica, and hydrated alumina, said hydrated alumina constituting from about 0.2 to about 10%, by weight, of the batch, said silicon carbide and zircon constituting from at least about 25 to not more than about 50%, by weight, of the batch, the major part of the silicon carbide being about −4+48 U.S. standard mesh with not more than about 20% of the silicon carbide passing a 70 U.S. standard mesh screen, the silicon carbide and zircon being present in a weight ratio not exceeding 2 parts zircon to 1 part silicon carbide, at least about 1%, by weight of the silica being volatilized silica, said 10% being based on total batch weight, and substantially all of the silica passing a 200 mesh screen, the alumina material being size graded to form a brickmaking batch of all of the ingredients, the alumina and silica being present in a weight ratio of about 90/10 between in which the silica ranges from about 5 to about 15%, by weight, of the body.

5. A batch according to claim 1 in which at least a portion of the alumina and silica content of the batch is in the form of calcined flint clay.

6. A batch according to claim 2 in which at least a portion of the alumina and silica content of the batch is in the form of calcined flint clay.

7. A batch according to claim 3 in which at least a portion of the alumina and silica content of the batch is in the form of calcined flint clay.

8. A batch according to claim 4 in which at least a portion of the alumina and silica content of the batch is in the form of calcined flint clay.

9. In those methods of making fired refractory bodies from refractory batches consisting essentially of finely divided silica, at least 1%, by weight of the batch, being volatilized silica, silicon carbide, and a high alumina material selected from the group consisting of alumina, aluminum ores, and mixtures thereof analyzing at least about 50% $Al_2O_3$, by analysis, the silicon carbide constituting from 50 to 70%, by weight, of the refractory, the major portion thereof being about −4+48 mesh U.S. standard series of screens with not more than about 20% of the silicon carbide passing a 70 U.S. standard screen, the alumina material to silica weight ratio being between 90/10 and 60/40, the improvement comprising including from 0.2 to 10%, by weight, of hydrated alumina in said batch in order to reduce coring of bodies made therefrom upon firing.

10. In those methods of making fired refractory bodies from refractory batches consisting essentially of finely divided silica, at least 1%, by weight of the batch, being volatilized silica, silicon carbide, zircon, and a high alumina material selected from the group consisting of alumina, aluminum ores, and mixtures thereof analyzing at least about 50% $Al_2O_3$, by analysis, the silicon carbide constituting from 50 to 70%, by weight of the refractory, the silicon carbide being about −4+48 mesh U.S. standard series of screens with not more than about 20% of the silicon carbide passing a 70 mesh U.S. standard screen, the alumina material to silica weight ratio being between 90/10 and 60/40, the silicon carbide and zircon being present in a weight ratio not exceeding 2 parts zircon to 1 part silicon carbide, the improvement comprising including from 0.2 to 10%, by weight, of hydrated alumina in said batch in order to reduce coring of bodies made therefrom upon firing.

11. In those methods of making fired refractory bodies from refractory batches consisting essentially of finely divided silica, at least 1%, by weight of the batch, being volatilized silica, silicon carbide, and a high alumina material selected from the group consisting of alumina, aluminum ores, and mixtures thereof analyzing at least about 50% $Al_2O_3$, by analysis, the silicon carbide constituting from 25 to not more than 50%, by weight of the refractory, the silicon carbide being about −4+48 mesh U.S. standard series of screens with not more than about 20% of the silicon carbide passing a 70 mesh U.S. standard screen, the alumina material and silica being present in a weight ratio of 90/10 but in which the silica ranges from about 5 to about 15%, by weight of the total batch, the improvement comprising including from 0.2 to 10%, by weight, of hydrated alumina in said batch in order to reduce coring of bodies made therefrom upon firing.

12. In those methods of making fired refractory bodies from refractory batches consisting essentially of finely divided silica, at least 1%, by weight of the batch, being volatilized silica, silicon carbide, zircon, and a high alumina material selected from the group consisting of alumina, aluminum ores, and mixtures thereof analyzing at least about 50% $Al_2O_3$, by analysis, the silicon carbide constituting from 25 to not more than 50%, by weight of the refractory, the silicon carbide being about −4+48 mesh U.S. standard series of screens with not more than about 20% of the silicon carbide passing a 70 mesh U.S. standard screen, the alumina material to silica weight ratio being about 90/10 in which the silica ranges from about 5 to about 15%, by weight of the batch, the silicon carbide and zircon being present in a weight ratio not exceeding 2 parts zircon to 1 part silicon carbide, the improvement comprising including from 0.2 to 10%, by weight, of hydrated alumina in said batch in order to reduce coring of bodies made therefrom upon firing.

References Cited
UNITED STATES PATENTS 3,230,100  1/1966  Davies et al. _____ 106—65

TOBIAS E. LEVOW, *Primary Examiner.*

JAMES E. POER, *Assistant Examiner.*